(12) United States Patent
Rafanello

(10) Patent No.: US 6,493,822 B1
(45) Date of Patent: Dec. 10, 2002

(54) FOREIGN DRIVE DETERMINATION AND DRIVE LETTER CONFLICT RESOLUTION

(75) Inventor: Benedict Michael Rafanello, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,240

(22) Filed: Sep. 16, 1999

(51) Int. Cl.[7] .................. G06F 15/177; G06F 9/00; G06F 3/00
(52) U.S. Cl. ................. 713/1; 713/1; 710/8; 710/10
(58) Field of Search ............. 713/1, 2; 710/2, 710/8, 10

(56) References Cited

U.S. PATENT DOCUMENTS

| | | | | |
|---|---|---|---|---|
| 5,809,329 A | | 9/1998 | Lichtman et al. ......... 395/828 |
| 5,815,705 A | * | 9/1998 | Slivka et al. .............. 713/2 |
| 5,896,546 A | | 4/1999 | Monahan et al. ......... 395/830 |
| 6,012,130 A | * | 1/2000 | Beyda et al. ............. 711/173 |
| 6,115,815 A | * | 9/2000 | Doragh et al. ............ 713/2 |
| 6,199,131 B1 | * | 9/2000 | Cabrera et al. ........... 707/203 |
| 6,170,055 B1 | * | 1/2001 | Meyer et al. ............. 713/2 |
| 6,308,264 B1 | * | 10/2001 | Rickey .................. 713/2 |
| 6,370,641 B1 | * | 4/2002 | Maia .................... 713/1 |

* cited by examiner

Primary Examiner—Thomas Lee
Assistant Examiner—Chun Cao
(74) Attorney, Agent, or Firm—David A. Mims, Jr.; Rudolf O. Siegesmund (57) ABSTRACT

A programable apparatus and method for assigning drive letters without conflicts to resource devices in a data processing system based upon three signature numbers called a resource serial number, a boot drive serial number and a sequence number, where the signature numbers are assigned by the data processing system's operating system to the resource devices.

16 Claims, 5 Drawing Sheets

FOREIGN DRIVE DETERMINATION AND DRIVE LETTER CONFLICT RESOLUTION

FIELD OF THE INVENTION

The present invention relates in general to a programable apparatus and method for assigning drive letters without conflicts to resource devices in a data processing system based upon three identification numbers assigned by the data processing system's operating system to the resource devices.

BACKGROUND OF THE INVENTION

Many operating systems adhere to the convention of using drive letters to identify accessible resources such as floppy disk drives, CD-ROM drives, and hard drives. Hard drives may be divided into partitions, in which case each partition on the hard drive may be treated as a separate resource. Single drive letters from A to Z are assigned to such resources and are utilized to permit system access to them.

Generally, drive letters are associated with resources during system initialization. In some operating systems, an attempt is made to ensure that each resource receives the same drive letter each time the system is booted. In this case, the drive letter assigned to a resource is said to be "sticky", and may be chosen by the user or by the operating system itself. Other operating systems do not adhere to this convention, and instead associate drive letters with resources based upon BIOS settings and/or the order in which the resources were discovered by the operating system. For operating systems of this type, simple configuration changes (such as the creation of a partition on an existing hard drive in the system or the addition of a new hard drive to the system) can result in changes to the drive letters associated with resources.

Consistently assigning the same drive letter to a specific resource ensures that the system will boot. If the operating system was installed on a specific resource, its configuration files will often refer to that resource by the drive letter assigned to that resource. Should that drive letter change, the configuration files of the operating system will refer to the wrong resource and the system may not boot. Additionally, most application software utilizes configuration files. If these configuration files reference resources specifically (using their drive letters), then a drive letter change in the system may result in application software failures. Therefore, the drive letters associated with resources should remain the same.

For operating systems employing "sticky" drive letters, there are two basic methods for associating a drive letter with a device. The first is the centralized database approach and the second is the distributed database approach. As this invention is not applicable to the centralized database approach, only the distributed database approach will be discussed.

In the distributed database approach, when a drive letter is assigned to a resource, configuration data containing that drive letter is written to the resource. When the operating system is booting, it merely has to read the configuration data on a resource to determine which drive letter to assign to the resource. Since the drive letter assigned to a resource is stored on the resource, it will exist as long as the resource exists. Furthermore, it is unaffected by configuration changes, such as a change in how the resource is connected to the system or the creation of a new partition on an existing drive in the system. However, drive letter assignment conflicts become possible if resources are moved from one system to another. If a resource is moved from one system to another, and if that resource contains the same drive letter assignment as an existing resource in the new system, the operating system must decide which resource actually gets the drive letter. An incorrect choice could result in a failure to boot. To assure the ability to boot, conflicts must be resolved in favor of existing resources in the system ("native" resources) and against resources which are "foreign" to the system ( i.e. a resource that was just moved to the system and which has not yet been assimilated). Therefore, a way of determining which resources are native and which resources are foreign is needed.

U.S. Pat. No. 5,815,705 discloses a drive letter conflict resolution system for resolving conflicts that occur when the operating system attempts to assign a drive letter to a compressed volume file.

U.S. Pat. No. 5,809,329 discloses a method of assigning a unique code to each device detected in the system. This device code consists of a system bus code which uniquely identifies the system bus where the device was found, and a unique device code which identifies the device on the bus where it was found. The bus code is then appended to the device code to produce the final code which is then used to uniquely identify the device. Logical configuration data is collected and resources are allocated based on the device identifying code and the logical configuration data. It should be noted, though, that the device code produced by this method will change if the device is moved from one bus in the system to another.

U.S. Pat. No. 5,896,546, discloses a method in which logical drive letters are assigned to a peripheral device in a computer using stored identifying information and a corresponding preferred drive letter assignment for each peripheral device having a preferred drive letter assignment. During initialization of the data processing system, identifying information such as a physical device specifier or a logical volume identifier is derived from the way the peripheral device is connected to the system. This identifying information is compared to similar stored identifying information in a central database. If a match is found, the peripheral is assigned the corresponding preferred drive letter, if possible. It should be noted, though, that the device identifier used by this method will change if the device is moved from one bus in the system to another. This could lead to resources not being assigned a drive letter or being assigned the wrong drive letter.

SUMMARY OF THE INVENTION

The present invention solves the problems identified above by introducing a program into an operating system for assigning up to three identification numbers to resources and resolving drive letter assignment conflicts based on these three identification numbers. The three identification numbers are stored on the resource itself, and travel with the resource should it be moved.

The first of the three numbers is called the Resource Serial Number (RSN). This is a unique number used to identify a specific resource. Every resource in a system will receive a unique RSN. The second number is the Boot Drive Serial Number (BDSN). The BDSN of a resource is set once the operating system has determined that it can use the resource. The third number is the Sequence Number (SQN). The purpose of the SQN is to identify which of the "native" resources associated with the system were present the last time a configuration change was made. The SQN of "native"

resources is updated everytime there is a configuration change in the system, including any changes in drive letter assignments. Finally, in order for a resource to be considered "native", its BDSN must match the RSN of the boot resource, and its SQN must match the SQN of the boot resource. Resources without an RSN, BDSN, or SQN, or whose BDSN and SQN do not match the RSN and SQN of the boot resource, are considered to be "foreign".

In operation, the operating system will use the three identification numbers during boot. If a drive letter conflict arises during system boot, the drive letter conflict is resolved by giving preferential treatment ( and hence the drive letter ) to the resource in the conflict which is determined to be "native" based upon its three identification numbers.

Typically, the RSN, BDSN and SQN of each resource will be assigned when the operating system is installed. When resources are added to a system, the RSN of each new resource will be set immediately while the BDSN and SQN of the new resources will be set when the new resources have been assigned drive letters which do not conflict with those of any existing "native" resources in the system.

DETAILED DESCRIPTION OF THE PREFERRED EMBODIMENTS

Figure 1:
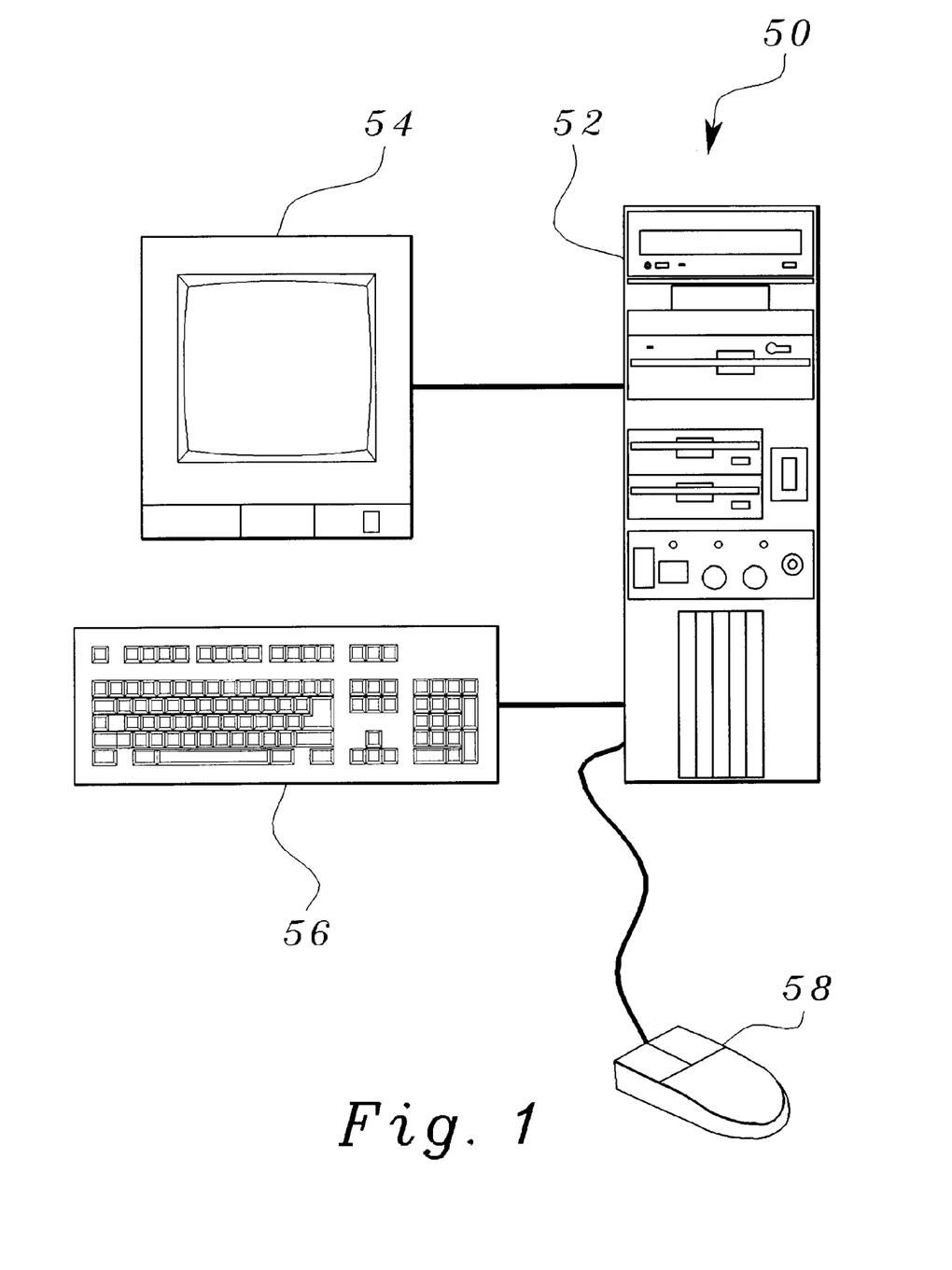
FIG. 1 depicts a data processing system.

With reference now to the figures and in particular with reference to FIG. 1 there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be any suitable computer such as an IBM PC computer, a product of International Business Machines Corporation, located in Armonk, N.Y. Although the depicted embodiment involves a personal computer, a preferred embodiment of the present invention may be implemented in other types of data processing systems, such as, for example, intelligent work stations or mini-computers.

Figure 2:
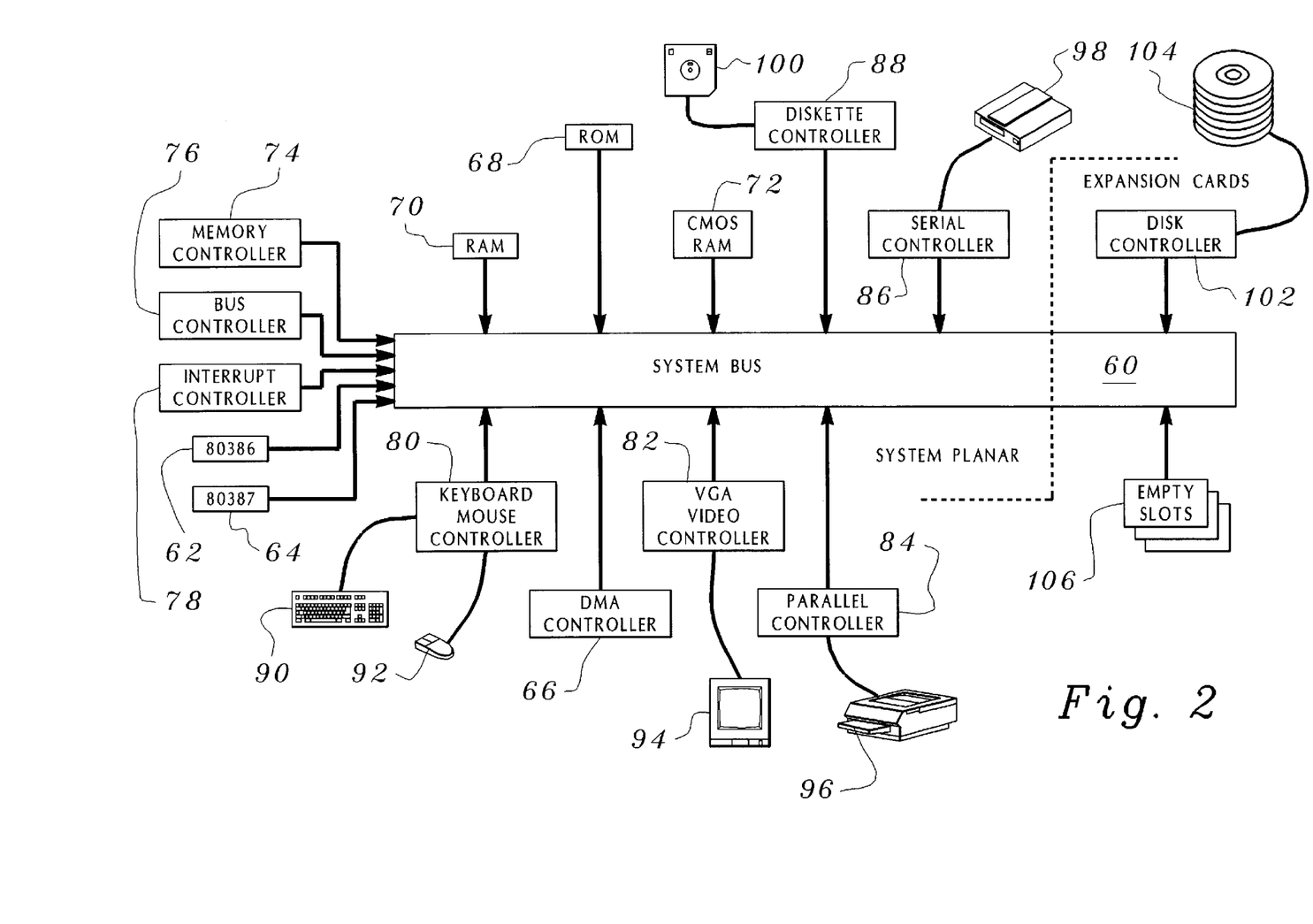
FIG. 2 depicts a block diagram of the components of a data processing system.

Referring now to FIG. 2, there is depicted a block diagram of selected components in data processing system in which a preferred embodiment of the present invention may be implemented. System unit 52 preferably includes a system bus 60 for interconnecting and establishing communication between various components in system unit 52. Microprocessor 62 is connected to system bus 60, and also may be conceded to system bus 60, and also may be connected to numeric coprocessor 64. Direct memory access (DMA ) controller 66 is also connected to system bus 60 and allows varius devices to appropriate cycles from microprocessor 62 during large I/O transfers.

Read only memory (ROM) 68 and Random Access Memory (RAM) 70 are also connected to system bus 60. ROM 68 contains the power-on self test (POST) and the Basic Input/Output System (BIOS) which control hardware operations such as those involving disk drives and the keyboard. Read Only memory (ROM) 68 is mapped into the microprocessor 62 address space. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94.

Those skilled in the art will appreciate that the hardware depicted in FIG. 2 may vary for specific implementations. For example, other peripheral devices may be connected to system bus 60, such as a tape drive connected between parallel controller 84 and printer 96, or other device adapters connected via empty slots 106.

Figure 3:
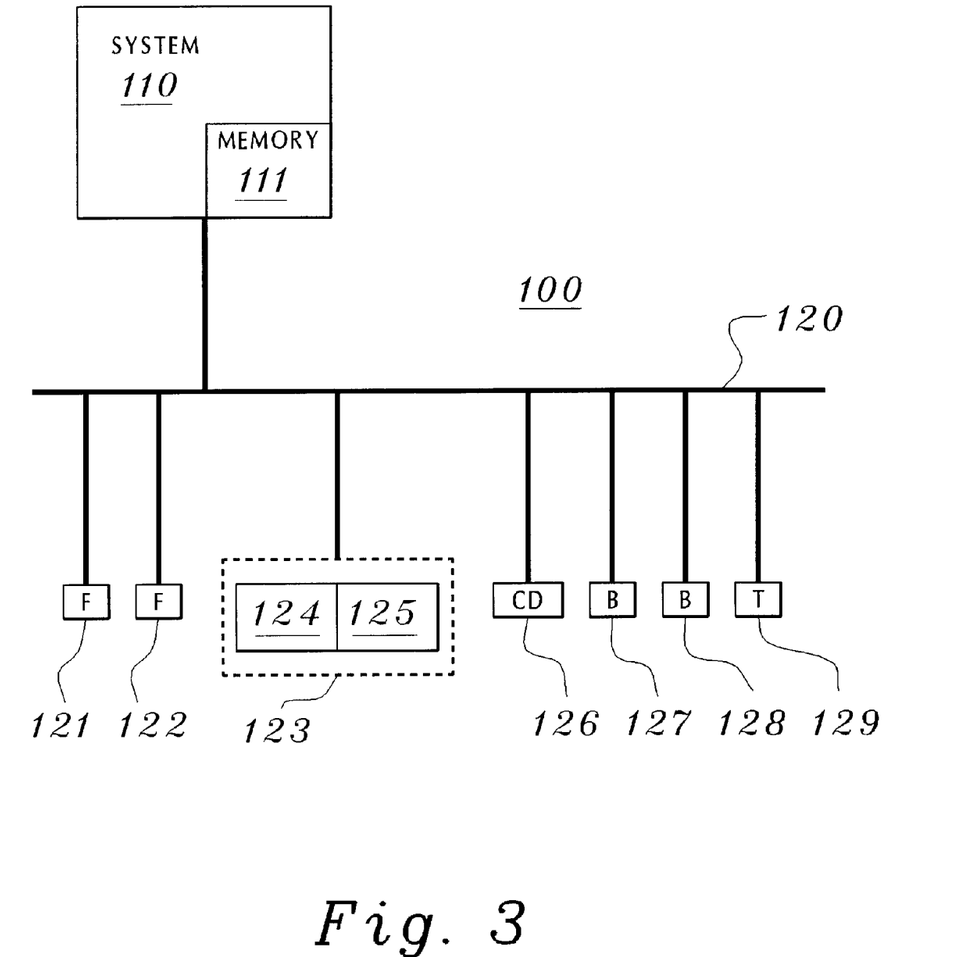
FIG. 3 depicts a block diagram of selected components.

With reference now to FIG. 3, another block of selected components is depicted, demonstrating the variety of peripheral devices which may be contained in a data processing system in which a preferred embodiment of the present invention may be implemented. System block 110 of a data processing system 100 represents all components, hardware or software, of such data processing system 100 which are not specifically shown. System block 110 includes a memory 111 containing an operating system. System block 110 is connected via bus 120 to various peripheral devices, which may include a 5¼ floppy drive 121, a 3½ floppy drive 122, a hard drive 123 which includes first and second partitions 124 and 125 in the example depicted, a CD-ROM drive 126, first and second Bernoulli drives 127 and 128, and tape drive 129. It will be understood that those skilled in the art that data processing system 100 may have all or any combination of the above peripherals, as well as other peripherals not shown. As used herein, the term peripheral drive refers not only to physical peripheral devices such as hard drives, floppy disk drives, or CD-Rom drives but also to logical peripheral devices such as hard drive partitions, etc.

The operating system in memory 111 will have the foreign drive determination and drive letter conflict resolution program introduced into it either at creation of the operating system or by various methods of updating the operating system and providing such updates to users. The operating system with the foreign drive determination and drive letter conflict resolution program contained within it will assign the three identification values to be stored on each writeable resource depicted in FIG. 2 and FIG. 3. Persons skilled in the art are familiar with many different ways to generate and assign unique numbers. For example, a random number generation algorithm can be seeded with the date and time from the computer to generate a unique 32 bit random number. In addition to the various methods of generating unique numbers, different operating systems will use different algorithms for assignment of drive letters. Therefore, the foreign drive determination and drive letter conflict resolution program would be adapted to each operating system to which it is introduced. However, the general principle of operation as disclosed herein would be the same for all operating systems to which the foreign drive determination and drive letter conflict resolution program is introduced.

The three identification values are called the resource serial number (RSN), the boot drive serial number (BDSN), and the sequence number (SQN). The purpose of the resource serial number is to provide a unique identifier for a resource which will not change for as long as the resource exists, even if the resource is moved from one system to another. The resource serial number will be set during the installation of the operating system for all resources in the system at that time. For resources added to the system after the installation of the operating system, a component of the operating system will set the resource serial number when the resource is discovered, if the resource does not already have a resource serial number.

The second and third identification numbers solve the problem of drive letter conflict resolution by indentifying whether a resource is "native" or "foreign". Drive letter conflicts are resolved by awarding the drive letter in question to the resource which is "native". If neither resource in the conflict is a "native" resource, then either resource may be given the drive letter without affecting the system's ability to boot. A resource is considered "native" if it is both "active" and "current", otherwise it is considered "foreign". The second identification number, the BDSN, is used to determine whether or not a resource is "active", and the third identification number, the SQN, is used to determine whether or not a resource is "current".

The BDSN provides a means to determine if a resource is "active" in the system. A resource is "active" if the operating system has assimilated the resource and is prepared to use it. This means that the resource has no conflicts with other "native" resources in the system and that the operating system has established access to the resource. To indicate that a resource is "active" in the current system, the BDSN of the resource is set to the RSN of the resource that the system booted from.

The SQN is used to determine if an "active" resource is "current", meaning that it has taken part in the most recent configuration changes that were made to the system. Every time a configuration change or drive letter assignment change is made in the system, the SQN of the boot resource is incremented and then written to the boot resource and all "native" resources in the system. Thus, an "active" resource is considered "current" if its SQN matches the SQN of the boot resource. The SQN is designed to detect and handle the case where a "native" resource is removed from the system, configuration changes are made, and then the resource is returned to the system. It can detect this case because, when the configuration change was made, all of the sequence numbers of the "native" resources in the system were updated but the sequence number of the removed resource was not. Since the sequence number of the removed resource does not match that of the boot resource anymore, the resource is not "current" anymore, which also means that it is not "native" anymore. This case needs to be detected and handled since the configuration data on the resource which was removed and then returned may be invalid due to the configuration changes that took place while it was not in the system.

The RSN, BDSN, and SQN are set for each resource in a system when the operating system containing the foreign drive determination and drive letter conflict resolution program is installed, or when an existing operating system is updated to include the foreign drive determination and drive letter conflict resolution program. The RSN for each resource is set to a different, unique value. Those skilled in the art will be familiar with several ways in which such a value can be generated. The BDSN of the boot resource will be set to the RSN of the boot resource, and the SQN of the boot resource will be set to 0. All other resources in the system will have their BDSN set to the RSN of the boot resource, and their SQN set to the SQN of the boot resource. Furthermore, every time a configuration change takes place or there is a change in one or more drive letter assignments, the SQN of the boot resource is incremented. It is then written to the boot resource and every "native" resource in the system. For resources added after the operating system was installed, the RSN is set immediately upon discovery of the resource by the operating system, if the resource did not already have a valid RSN. The BDSN and SQN of the resource are only set when the resource has been assimilated by the operating system, meaning that it does not conflict with any existing "native" resources and that the operating system has established access to it. This effectively prevents drive letter conflicts from arising between "native" resources. When the BDSN and the SQN are set, they are set to the RSN and SQN of the boot resource, respectively.

The foreign drive determination and drive letter conflict resolution program (FDCR) operates using the BDSN, SQN and RSN explained in detail above to identify native resources. The FDCR then accomplishes conflict resolution by discriminating between two resources, one of which is native, and giving preferential treatment to the resource identified as native. The meaning of the term preferential treatment as used herein depends upon the drive letter assignment algorithm used by the operating system. For operating systems which do not implement sticky drive letters, resources receiving preferential treatment get their drive letters assigned first. For operating systems implementing sticky drive letters, if more than one resource claims the same drive letter, the resource receiving preferential treatment will be the one that gets the drive letter.

The resource serial number, boot drive serial number, and sequence number required for the present invention must be stored in some retrievable form, both on the resources themselves and in system memory for use while the system is running. Those skilled in the art will recognize that a variety of data structures may be used to store the required information. The requirement that this information be stored on the resource makes read only media, such as CD-ROM drives, generally unsuitable for use with the current invention.

Figure 4A:
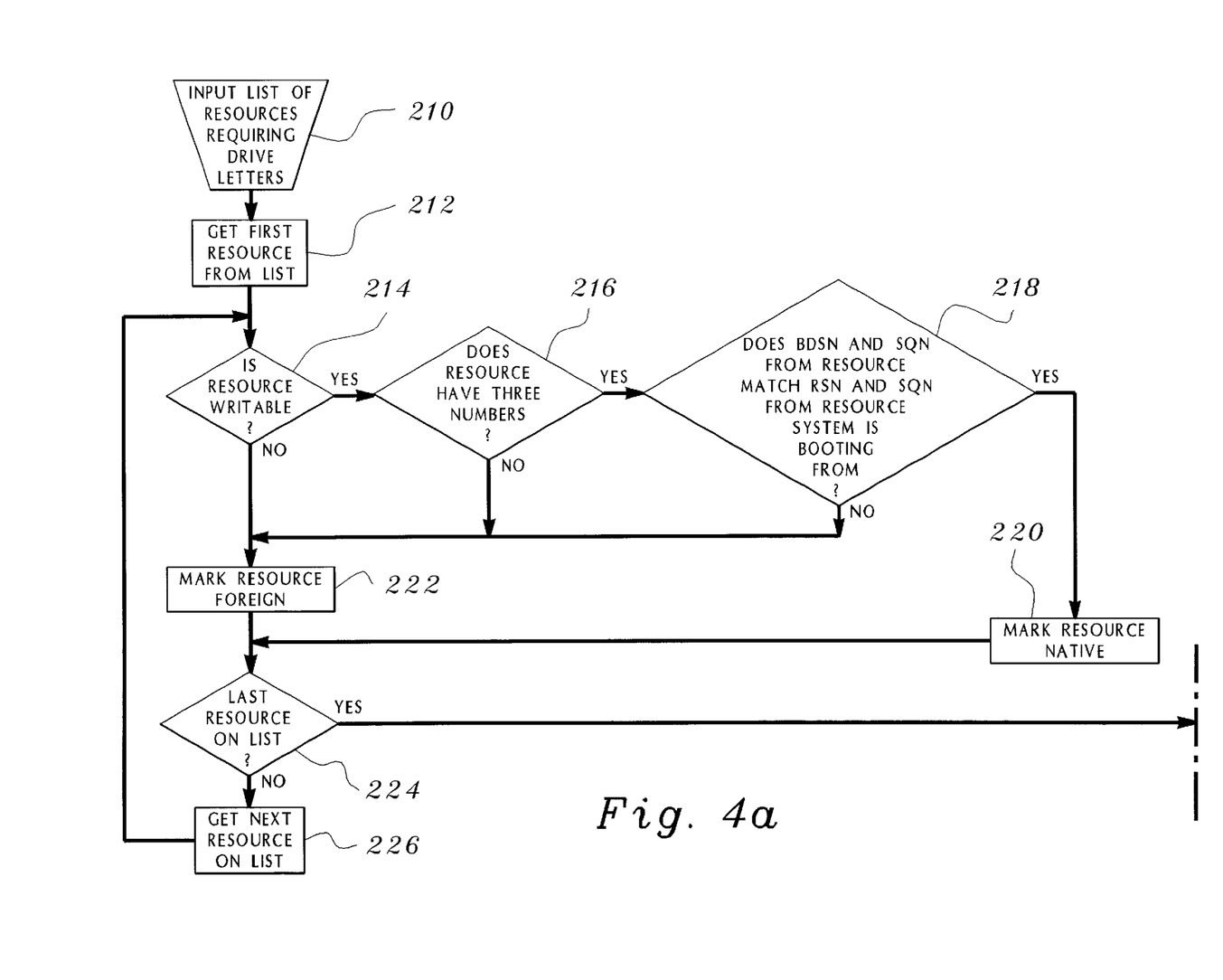
FIG. 4 depicts a flow diagram of the drive letter assignment process.
Figure 4B:
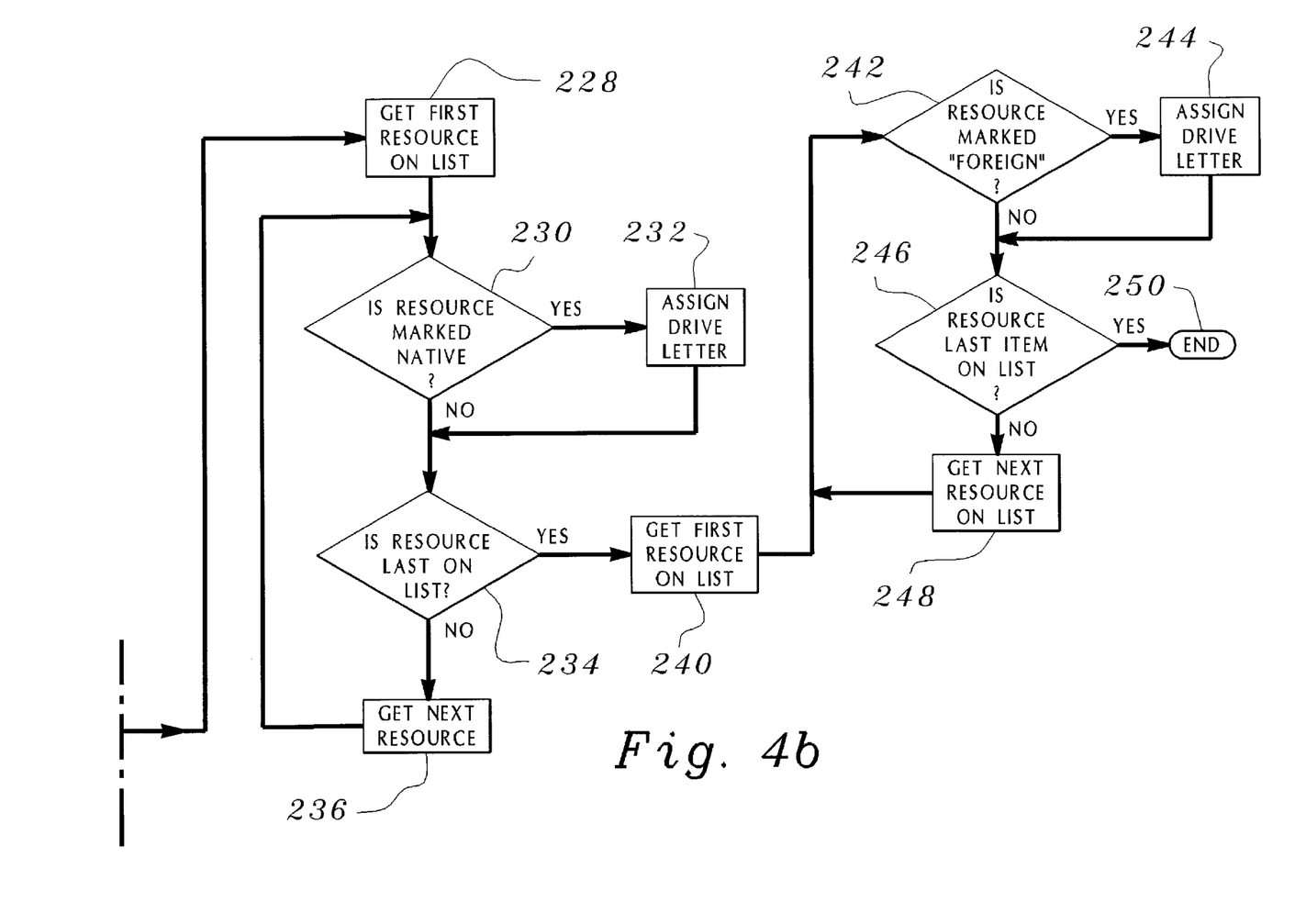

Referring to FIG. 4, a flow chart of a drive letter conflict resolution system incorporating the current invention is shown. First a list of resources requiring drive letters must be created (210). Next, the first resource on the list is examined (212). The program determines if the resource is writeable (214). If the resource is writeable, the program examines the resource to see if it has all three identification numbers: a resource serial number, a boot drive serial number and a sequence number (216). If the resource has all three numbers, the program compares the boot drive serial number and the sequence number of the resource with the resource serial number and the sequence number of the resource that the system is booting from to find out if the numbers match (218). If the numbers match, the program determines that the resource is native and marks the resource as native (220).

If at step 214 the program determines that the resource is not writeable, then the resource is marked as foreign (222). If at step 216 the program determines that the resource does not have a resource serial number, a boot drive serial number and a sequence number, then the resource is marked as foreign (222). If at step 218, the program determines that the boot drive serial number and the sequence number of the resource does not match the resource serial number and sequence number of the resource that the system is booting from, then the resource is marked as foreign (222).

The program will determine if this is the last item in the list (224). If the resource being examined is not the last item in the list, the program will get the next resource in the list and proceed to step 214. If the resource is the last item in the list, the program will get the first resource in the list (228). Next the program will examine the first resource in the list and determine if the resource is marked native (230). If the resource is marked native the program will assign a drive letter to the resource (232). For operating systems employing sticky drive letters, the resource would receive the drive letter associated with it. For operating systems not employing sticky drive letters, the resource would receive the first drive letter not already assigned to a resource. Next, the program would determine if this is the last resource on the list (234). If the program determines that the resource is not the last resource on the list, then the program will get the next resource on the list (236) and then proceed to step 230. If the program determines that the resource is the last resource on the list the program will proceed to get the first resource in the list (240). Next the program will determine if the resource is foreign (242). If the resource is foreign, the program will proceed to step 244 and assign a drive letter to the resource. For operating systems employing sticky drive letters, this would be the drive letter associated with the resource if that drive letter has not already been assigned to some other resource. If the desired drive letter is not available, then the first available drive letter can be assigned instead. For operating systems not employing sticky drive letters, the resource would receive the first drive letter not already assigned to another resource.

If the program determines that the resource is not foreign at step 242, then the program will proceed to step 246 and determine if the resource is the last resource on the list (246). If the resource is the last resource on the list, the program will end (250) because all resources have been assigned a drive letter. If the resource is not the last resource on the list, the program will get the next resource on the list and proceed to step 242.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed:

1. A method for identifying native resources in a data processing system having a boot resource with a boot resource RSN and a boot resource SQN comprising the steps of:
   obtaining a resource BDSN and a resource SQN;
   comparing the resource BDSN and the boot resource RSN;
   comparing the resource SQN and the boot resource SQN; and
   responsive to the resource BDSN matching the boot resource RSN and the resource SQN matching the boot resource SQN, identifying the resource as a native resource.

2. A method for giving preferential treatment to either a first resource or a second resource attached to a data processing system having a boot resource RSN and a boot resource SQN comprising:
   obtaining a first resource BDSN and a first resource SQN;
   obtaining a second resource BDSN and a second resource SQN;
   comparing the first resource BDSN and the boot resource RSN;
   comparing the first resource SQN and the boot resource SQN; and
   if the first resource BDSN matches the boot resource RSN and if the first resource SQN matches the boot resource SQN, giving the first resource preferential treatment; or
   if the first resource BDSN does not match the boot resource RSN or if the first resource SQN does not match the boot resource SQN; then
   comparing the second resource BDSN and the boot resource RSN;
   comparing the second resource SQN and the boot resource SQN; and
   if the second resource BDSN matches the boot resource RSN and if the second resource SQN matches the boot resource SQN, giving the second resource preferential treatment.

3. A programmable apparatus for giving preferential treatment for drive letter assignment comprising,
   programmable hardware comprising;
      a computer;
      a boot resource having a boot resource RSN and a boot resource SQN
      at least one resource having a resource BDSN and a resource SQN attached to said computer;
      an operating system in the memory of said computer;
      a drive letter assignment algorithm in the operating system;
      a program in the operating system;
      said program causing the computer to determine whether the resource BDSN matches the boot resource RSN and if the resource SQN matches the boot resource SQN; and
      if the resource BDSN matches the boot resource RSN and if the resource SQN matches the boot resource SQN, the program causing the operating system to give preferential treatment to the resource.

4. A computer implemented process to identify native resources and give preferential treatment to the native resources comprising:
   using a computer having a boot resource with a boot resource RSN and a boot resource SQN, performing the following series of steps:
      executing a program within an operating system to obtain a resource BDSN and resource
      executing the program to determine if the resource BDSN matches the boot resource RSN and the resource SQN matches the boot resource SQN;
      responsive to determining that the resource BDSN matches the boot resource RSN and the resource SQN matches the boot resource SQN, executing the program to identify the resource as a native resource;
      executing a drive letter assignment algorithm employed by the operating system so that the native resource receives preferential treatment.

5. A method for drive letter assignment conflict resolution, the method comprising the computer implemented steps of:
   executing instructions from a computer memory to obtain a boot resource RSN and a boot resource SQN;
   executing instructions from a computer memory to obtain a resource BDSN and a resource SQN;
   executing instructions from a computer memory to determine whether the resource BDSN matches the boot resource RSN and whether the resource SQN matches the boot resource SQN;
   responsive to the resource BDSN matching the boot resource RSN and the resource SQN matching the boot resource SQN, executing instructions from a computer memory to identify the resource as a native resource;

executing instructions from a computer memory to give preferential treatment to the native resource.

6. A computer program product on a computer-readable medium comprising:

first instructions from a program to obtain a boot resource RSN and a boot resource SQN from a boot resource;

second instructions from said program to obtain a resource BDSN and a resource SQN from a resource;

third instructions from said program to compare the resource BDSN and the boot resource RSN and to compare the resource SQN and the boot resource SQN;

fourth instructions from said program to determine whether the resource BDSN matches the boot resource RSN and to determine whether the resource SQN matches the boot resource SQN;

responsive to determining that the resource BDSN matches the boot resource RSN and to determining that the resource SQN matches the boot resource SQN, fifth instructions from said program to identify said resource as a native resource; and sixth instructions from said program, to give preferential treatment to said native resource.

7. A method for assigning drive letters to a plurality of resources in a data processing system having a boot resource with a boot resource RSN and a boot resource SQN and having an operating system capable of assigning an RSN, a BDSN and an SQN to each of said resources comprising the steps of:

creating a list of each of the plurality of resources;

determining if each of the plurality of resources is native or foreign;

assigning drive letters to all of the native resources;

assigning drive letters to all of the foreign resources;

wherein the step of determining if each of the plurality of resources is native or foreign further comprises:

determining if the resource is writeable;

responsive to determining if the resource is writeable, determining if the resource has a resource RSN, a resource SDSN and a resource SQN;

responsive to determining that the resource has an resource RSN, a resource BDSN and a resource SQN comparing the resource BDSN with the boot resource RSN and comparing the resource SQN with the boot resource SQN;

responsive to determining that the resource BDSN matches the boot resource RSN and the resource SQN matches the boot resource SQN, marking the resource native.

8. The method of claim 7 wherein the step of creating a list of each of the plurality of resources further comprises:

creating a file containing a list of resources requiring drive letters;

retrieving the first resource from the list; and determining if the first resource is writeable.

9. The method of claim 7 wherein the step of determining if each of the plurality of resources is native or foreign further comprises:

determining if the resource is writeable;

responsive to determining if the resource is writeable, determining if the resource has a resource RSN , a resource BDSN and a resource SQN;

responsive to determining that the resource has a resource RSN, a resource BDSN and a resource SQN, comparing the resource BDSN with the boot resource RSN and comparing the resource SQN with the boot resource SQN;

responsive to determining that the resource BDSN does not match the boot resource RSN or the resource SQN does not match the boot resource SQN, marking the resource foreign.

10. The method of claim 7 wherein the step of determining if each of the plurality of resources is native or foreign further comprises:

determining if the resource is writeable;

responsive to determining that the resource is not writeable, marking the resource foreign; and obtaining the next resource on the list.

11. The method of claim 7 wherein the step of assigning drive letters to all of the native resources further comprises:

creating a file containing a list of resources requiring drive letters;

retrieving the first resource from the list;

responsive to obtaining first resource from list, determining if resource is marked native;

assigning drive letter to resource;

repeating the step of obtaining resource from list and determining if resource is marked native until all resources marked native have been assigned drive letters;

responsive to assigning all native resources drive letters, obtaining first resource from list;

determining if the first resource is marked foreign;

assigning a drive letter to the first resource;

repeating the step of obtaining the first resource from the list and determining if the first resource is marked foreign until all resources marked foreign have been assigned drive letters.

12. A programmable apparatus for drive letter conflict resolution between native and foreign resources comprising:

at least one computer; and a plurality of resources attached to said computer;

a boot resource having a boot resource RSN and a boot resource SQN, an operating system installed on said computer having a drive letter assignment algorithm; and a program introduced into said operating system for assigning an RSN, a BDSN and an SQN to all resources attached to said computer;

whereby said computer is directed by said program to assign a resource serial number, a boot drive serial number and a sequence number to each of said plurality of resources; and wherein said computer is directed by said operating system to compare the resource BDSN to the boot resource RSN and to compare the resource SQN to the boot resource SQN; and responsive to determining that the resource BDSN matches the boot resource RSN and to determining that the resource SQN matches the boot resource SQN, marking the resource native.

13. The programmable apparatus of claim 12 wherein said computer is directed by said operating system to compare the resource BDSN to the boot resource RSN and to compare the resource SQN to the boot resource SQN; and responsive to determining that the resource BDSN does not match the boot resource RSN or to determining that the resource SQN does not match the boot resource SQN, marking the resource foreign.

14. The programmable apparatus of claim 12 wherein said computer is directed by said operating system to assign drive letters to all resources marked native; and responsive to assigning drive letters to all resources marked native, assigning drive letters to all resources marked foreign.

15. A computer readable memory for causing a computer to mark resources attached to said computer native or foreign comprising:

a computer readable storage medium;

a resource memory for receiving an RSN, a BDSN and an SQN;

a boot resource having a memory for receiving an RSN and an SQN;

an operating system stored in said storage medium; wherein, the storage medium, so configured by said operating system, causes the computer to assign an RSN, a BDSN and an SQN to each of said resources; and wherein said operating system marks all resources where the resource BDSN matches the boot resource RSN and where the resource SQN matches the boot resource SQN as native;

wherein said operating system marks all resources where the resource BDSN does not match the boot resource RSN or where the resource SQN does not match the boot resource SQN as foreign; and wherein, responsive to marking all resources native or foreign, the operating system first assigns drive letters to all of the native resources and then assigns drive letters to all of the foreign resources.

16. A computer implemented process to accomplish drive letter conflict resolution comprising:

using a computer with attached resources and an operating system containing a program for said computer implemented process, performing the following series of steps:

powering the computer;

determining if the first resource is writeable;

responsive to determining that the resource is not writeable, marking the resource foreign and obtaining the next resource on the list;

responsive to determining if the resource is writeable, determining if the resource has a RSN, BDSN and SQN;

responsive to determining that the resource has a RSN, BDSN and SQN comparing the resource BDSN to the boot resource RSN and comparing the resource SQN to the boot resource SQN;

responsive to determining that the resource BDSN matches the boot resource RSN and to determining that the resource SQN matches the boot resource SQN, marking the resource native;

responsive to determining that the resource BDSN does not match the boot resource RSN or to determining that the resource SQN does not match the boot resource SQN, marking the resource foreign;

assigning drive letters to all native resources; and responsive to first assigning drive letters to all native resources, assigning drive letters to all foreign resources.

* * * * *